United States Patent
Rosseel et al.

(10) Patent No.: US 10,085,382 B2
(45) Date of Patent: Oct. 2, 2018

(54) AGRICULTURAL BALER, AGRICULTURAL BALER SYSTEM, METHOD FOR CONFIGURING AN AGRICULTURAL BALER, AND METHOD FOR BALING

(71) Applicant: CNH Industrial America LLC, New Holland, PA (US)

(72) Inventors: Bram Rosseel, Snellegem (BE); Jeroen Devroe, Izegem (BE); Dries Liefooghe, Veurne (BE); Dieter Kindt, Vladslo (BE); Thomas Vandaele, Zedelgem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/299,044

(22) Filed: Oct. 20, 2016

(65) Prior Publication Data
US 2017/0105347 A1   Apr. 20, 2017

(30) Foreign Application Priority Data
Oct. 20, 2015   (BE) .................................. 2015/5676

(51) Int. Cl.
*A01F 15/04*   (2006.01)
*A01F 15/10*   (2006.01)
*A01D 89/00*   (2006.01)

(52) U.S. Cl.
CPC .......... *A01D 89/002* (2013.01); *A01F 15/042* (2013.01); *A01F 15/10* (2013.01); *A01F 15/101* (2013.01); *A01F 2015/102* (2013.01)

(58) Field of Classification Search
CPC .. A01F 15/101; A01F 15/10; A01F 2015/102; A01F 2015/103; A01D 89/00; A01D 89/001
USPC ......................................... 100/7, 188 R, 189
See application file for complete search history.

(56) References Cited

U.S. PATENT DOCUMENTS

| | | | | |
|---|---|---|---|---|
| 4,275,550 A | * | 6/1981 | Swenson | A01F 15/04 100/189 |
| 4,525,991 A | | 7/1985 | Naaktgeboren | |
| 4,604,858 A | * | 8/1986 | Esau | A01F 15/04 100/179 |
| 4,656,938 A | * | 4/1987 | Webb | A01F 15/101 100/189 |
| 4,928,462 A | * | 5/1990 | Lippens | A01F 15/101 100/142 |
| 6,385,952 B1 | | 5/2002 | Bergkamp et al. | |

(Continued)

*Primary Examiner* — Jimmy T Nguyen
(74) *Attorney, Agent, or Firm* — Peter K. Zacharias; Patrick M. Sheldrake (57) ABSTRACT

An agricultural baler including a bale chamber; a feeder duct communicating with the bale chamber for charges of crop material to be transferred from the feeder duct into the bale chamber; a plunger reciprocally moveable within the bale chamber to compress successive charges of crop material received from the feeder duct to form a bale; and a feeder operable within the feeder duct to accumulate a charge of crop material therein and then stuff that accumulated charge into the bale chamber. The feeder includes at least one first tine and at least one second tine, each having a leading face for engaging the crop material. A width of a frontal area of the leading face of the second tine is smaller than a width of a frontal area of the leading face of the first tine.

14 Claims, 8 Drawing Sheets

(56) References Cited

U.S. PATENT DOCUMENTS

| | | | |
|---|---|---|---|
| 6,425,234 B1* | 7/2002 | Krone | A01F 15/101 56/341 |
| 7,650,741 B2 | 1/2010 | Graber et al. | |
| 9,386,750 B2* | 7/2016 | Verhaeghe | A01F 15/0825 |
| 2013/0104512 A1* | 5/2013 | Duenwald | A01F 15/101 56/341 |

* cited by examiner

AGRICULTURAL BALER, AGRICULTURAL BALER SYSTEM, METHOD FOR CONFIGURING AN AGRICULTURAL BALER, AND METHOD FOR BALING

CROSS REFERENCE TO RELATED APPLICATION

This application claims priority to Belgium Application No. 2015/5676 filed Oct. 20, 2015, the contents of which are incorporated herein by reference.

FIELD OF THE INVENTION

The present invention relates to agricultural balers, and more specifically to balers of the traditional rectangular type, i.e. balers which produce bales of crop material which are rectangular in side view. The present invention further relates to a baler system comprising an agricultural baler, a method for configuring an agricultural baler, as well as to a method for baling.

BACKGROUND OF THE INVENTION

In EP0236578 there is disclosed a baler of basically conventional design in that it comprises a bale chamber or chamber in which a bale of crop material is formed, having an inlet opening formed therein communicating with a feeder duct in which charges of crop material are accumulated which subsequently are transferred or stuffed in the bale chamber for compression by a reciprocally moveable plunger operating within the bale chamber. Within the feeder duct feeder means are operable to accumulate a charge of crop material therein and then stuff that accumulated charge into the bale chamber. In this particular baler, the feeder means include two tine bars each rotatable about its own axis and about an offset axis. The tine bars are rotatable mounted on a tine bar holding member for rotation about their own axis. The tine bar holding member is rotatable about the offset axis. Both tine bars have mounted thereon two sets of tines. One of the tine bars has two sets of packer tines mounted thereon, the sets being angularly offset over 180°, while the other one of the tine bars has a set of packer tines and a set of longer stuffer tines mounted thereon, the sets being angularly offset over 180°. In operation the tine bars are rotated about the offset axis in a direction of rotation while the tine bars are rotated about their respective own axis in a direction of rotation opposite to the direction of rotation of the tine bars about the offset axis. The packer tines are moved through the feeder duct along an accumulating movement path wherein the packer tines move crop material from the lower end of the feeder duct toward the upper end of the feeder duct in order to accumulate a charge of crop material at the upper end of the feeder duct. The packer tines pack the crop material together in order to form a pre-compressed charge of crop material at the end of the feeder duct. The stuffer tines are moved through the feeder duct along a stuffing movement path wherein the stuffer tines stuff, i.e. transfer, the accumulated charge of crop material into the bale chamber. For accumulating and stuffing, the packer tines and the stuffer tines have a plate shaped leading face that is pushed against the crop material.

SUMMARY OF THE INVENTION

The object of the present invention to provide an improved baler.

The baler according to the invention comprises a bale chamber; a feeder duct communicating with the bale chamber for charges of crop material to be transferred from the feeder duct into the bale chamber; a plunger reciprocally moveable within the bale chamber to compress successive charges of crop material received from the feeder duct to form a bale; and feeder means operable within the feeder duct to accumulate a charge of crop material therein and then stuff that accumulated charge into the bale chamber, wherein the feeder means comprise at least one first tine and at least one second tine, each having a leading face for engaging the crop material. According to the invention the width of frontal area of the leading face of the second tine is smaller than the width of the frontal area of the leading face of the first tine.

In a baler according to the invention the at least one second tine will, as a result of having a leading face with a frontal area that has a smaller width, rather cut into the crop material than push the crop material forward, thereby providing a reduced pushing effect relative to the at least one first tine. Thus in a baler according to the invention a first tine can provide a certain full pushing effect while a second tine can provide a reduced pushing effect. This allows for addressing a drawback of a baler according to the prior art as described in EP0236578, that with specific types of crop material and/or under certain conditions, the density of the accumulated charge of crop material that is stuffed into the bale chamber is not homogeneous throughout the charge of crop material. By causing a selection of tines of such baler to have a reduced pushing effect the homogeneity of the charge of crop material can advantageously be increased in several ways as described herein below.

Providing the feeder means with at least one first tine and at least one second tine according to the invention is in particular advantageous in a baler wherein the feeder means comprise at least two tine bars each having mounted thereon a set of tines. In a preferred embodiment of the baler according to the invention the feeder means comprise at least two tine bars each having mounted thereon a set of tines, wherein the set of tines of at least one of said tine bars comprises at least one first tines and the set of tines of at least an other one of said tine bars comprises at least one second tine. In particular, each of the two tine bars is rotatable about its own axis and about an offset axis. The tine bars are rotatable mounted on a tine bar holding member for rotation about their own axis. The tine bar holding member is rotatable about the offset axis. The feeder means are configured to cause the tine bars to rotate about their respective own axis when the tine bar holding member is rotated about the offset axis such that the tines of the tine bars are caused to move along a path of movement.

In an advantageous embodiment of the baler of the preferred embodiment having feeder means having at least two tine bars, the feeder means are configured to cause the tines of said tine bar having mounted thereon a set of tines comprising at least one first tine to move at least along a stuffing movement path, and the feeder means are configured to cause the tines of said tine bar having mounted thereon a set of tines comprising at least one second tine to move along an accumulating movement path. In a particular advantageous embodiment thereof, the set of tines of said tine bar that is caused to move at least along a stuffing movement path, consists of first tines. This embodiment provides stuffing with full pushing effect along the whole length of one of the tine bars, and accumulating with at least one tine bar having reduced pushing effect along at least part of the length thereof.

In an advantageous embodiment of the baler according to the invention the feeder means comprise a tine bar having mounted thereon a set of tines, wherein said set of tines comprises at least one first tine and at least one second tine. This allows to reduce the pushing effect along a part of the length of the tine bar, i.e. along a part of the width of the charge of crop material being accumulated in the feeder duct. In case the density of the part of the crop material that is being engaged and pushed forward by a first tine is relatively high, the crop material that is being engaged and pushed forward by said first tine will tend to move side ways toward the part of the crop material that is being engaged by a second tine having the reduced pushing effect in stead of moving forward and further increasing the density. In case the density of the part of the crop material that is being engaged and pushed forward by a first tines is relatively low, the crop material that is being engaged and pushed forward by said first tine will move forward and increase the density in said part, whereas a second tine that engages a part having a relatively high density will cut into the part it engages and thereby loosen the crop material in said part. In both cases the homogeneity of the charge of crop material is increased.

In an advantageous embodiment thereof the set of tines of the tine bar having mounted thereon at least one first tine and at least one second tine, comprises a plurality of first tines and a plurality of second tines, wherein the first tines and second tines are mounted alternatingly along the length of said tine bar. In an alternative embodiment said set of tines comprises a plurality of first tines and a plurality of second tines, wherein groups of first tines and groups of second tines are mounted alternatingly along the length of said tine bar.

In an advantageous embodiment of the baler according to the invention having a tine bar having mounted thereon a set of tines, wherein said set of tines comprises at least one first tine and at least one second tine, the feeder means are configured to cause the tines of said tine bar having mounted thereon a set of tines comprising at least one first tine and at least one second tine to move through the feeder duct along an accumulating movement path. The provision of first tines and second tines on a tine bar is in particular effective in increasing the homogeneity of a charge of crop material while accumulating a charge of crop material. However, provision of first and second tines on a tine bar can also help to increase homogeneity while stuffing a charge of crop material into the bale chamber by reducing the pushing effect on parts of the charge of crop material that would otherwise be subjected to a relatively high increase in density during the stuffing.

In an advantageous embodiment of the baler according to the invention the feeder means comprise at least two tine bars each having mounted thereon a set of tines, wherein the set of tines of at least one of said tine bars consists of first tines and the set of tines of at least an other one of said tine bars comprises at least one second tine. In this embodiment the reduced pushing effect is not effectuated while the tines of at least one of the tine bars is moved through the feeder duct. In an advantageous embodiment thereof the feeder means are configured to cause the tines of said tine bar having mounted thereon a set of tines consisting of first tines to move at least along a stuffing movement path. This embodiment provides stuffing with full pushing effect along the whole length of one of the tine bars, and accumulating with at least one tine bar having reduced pushing effect along at least part of the length thereof. In an advantageous embodiment thereof the set of tines of at least one tine bar consists of first tines, whereas the set of tines of at least another one of the tine bars consists of second tines. In this embodiment it is possible that at least one of the tine bars provides stuffing with full pushing effect, while at least one other tine bar provides packing with reduced pushing effect.

In a further advantageous embodiment of the baler according to the invention at least the first tine comprises a tine body having mounted thereon a plate, said plate defining the leading face having the frontal area with the larger width. This allows for all tines of the baler to have the same tine body, wherein for instance the first tines have a plate mounted thereon while the second tines have no plate mounted thereon. In an advantageous embodiment thereof the feeder means comprise a plurality of tine bodies provided with an arrangement for removable mounting plates thereon for providing said tine bodies with said leading face. This allows for exchanging plates on a tine body, and thus for selectively configuring a tine body to be a first tine or a second tine depending on the desired effect.

In a further advantageous embodiment of the baler according to the invention at least the second tine comprises a tine body having mounted thereon a plate, said plate defining the leading face having frontal area with the smaller width, wherein the width of the plate of the second tine is at least the width of the tine body of the second tine.

The present invention further relates to a baler system. The baler system according to the invention comprises a baler comprising a bale chamber; a feeder duct communicating with the bale chamber for charges of crop material to be transferred from the feeder duct into the bale chamber; a plunger reciprocally moveable within the bale chamber to compress successive charges of crop material received from the feeder duct to form a bale; and feeder means operable within the feeder duct to accumulate a charge of crop material therein and then stuff that accumulated charge into the bale chamber; wherein the feeder means comprise a plurality of tine bodies provided with an arrangement for mounting plates thereon for providing said tine bodies with a leading face. In addition to said baler, the baler system according to the invention comprises a plurality of first plates and a plurality of second plates configured to be mounted on the tine bodies of said baler for providing said leading face, wherein the width of the frontal area of the leading face defined by the second plates is smaller than the width of the frontal area of the leading face provided by the first plates.

The present invention further relates to a method for configuring a baler, said baler comprising a bale chamber; a feeder duct communicating with the bale chamber for charges of crop material to be transferred from the feeder duct into the bale chamber; a plunger reciprocably moveable within the bale chamber to compress successive charges of crop material received from the feeder duct to form a bale; and feeder means operable within the feeder duct to accumulate a charge of crop material therein and then stuff that accumulated charge into the bale chamber; wherein the feeder means comprise at least one first tine body and at least one second tine body. The method according to the invention for configuring said baler comprises mounting on said first tine body a first plate and mounting on said second tine body a second plate, wherein the width of the frontal area of the leading face defined by the second plate is smaller than the width of the frontal area of the leading face provided by the first plate.

The present invention further relates to a method for baling. The method for baling according to the invention comprises accumulating a charge of crop material in a feeder duct; stuffing an accumulated charge of crop material into a bale chamber; and compressing successive charges of crop material in the bale chamber to form a bale. According to the invention either or both accumulating and stuffing is performed using at least one first tine and at least one second tine, each having a leading face for engaging the crop material, wherein the width of the frontal area of the leading face of the second tine is smaller than the width of the frontal area of the leading face of the first tine.

BRIEF DESCRIPTION OF THE DRAWINGS

The accompanying drawings are used to illustrate present non-limitative preferred exemplary embodiments of the present invention. The above stated and other advantages, features and objectives of the invention will become more apparent, and the invention better understood, from the following detailed description when read in combination with the accompanying drawings, in which.

DETAILED DESCRIPTION OF THE INVENTION

Figure 1:
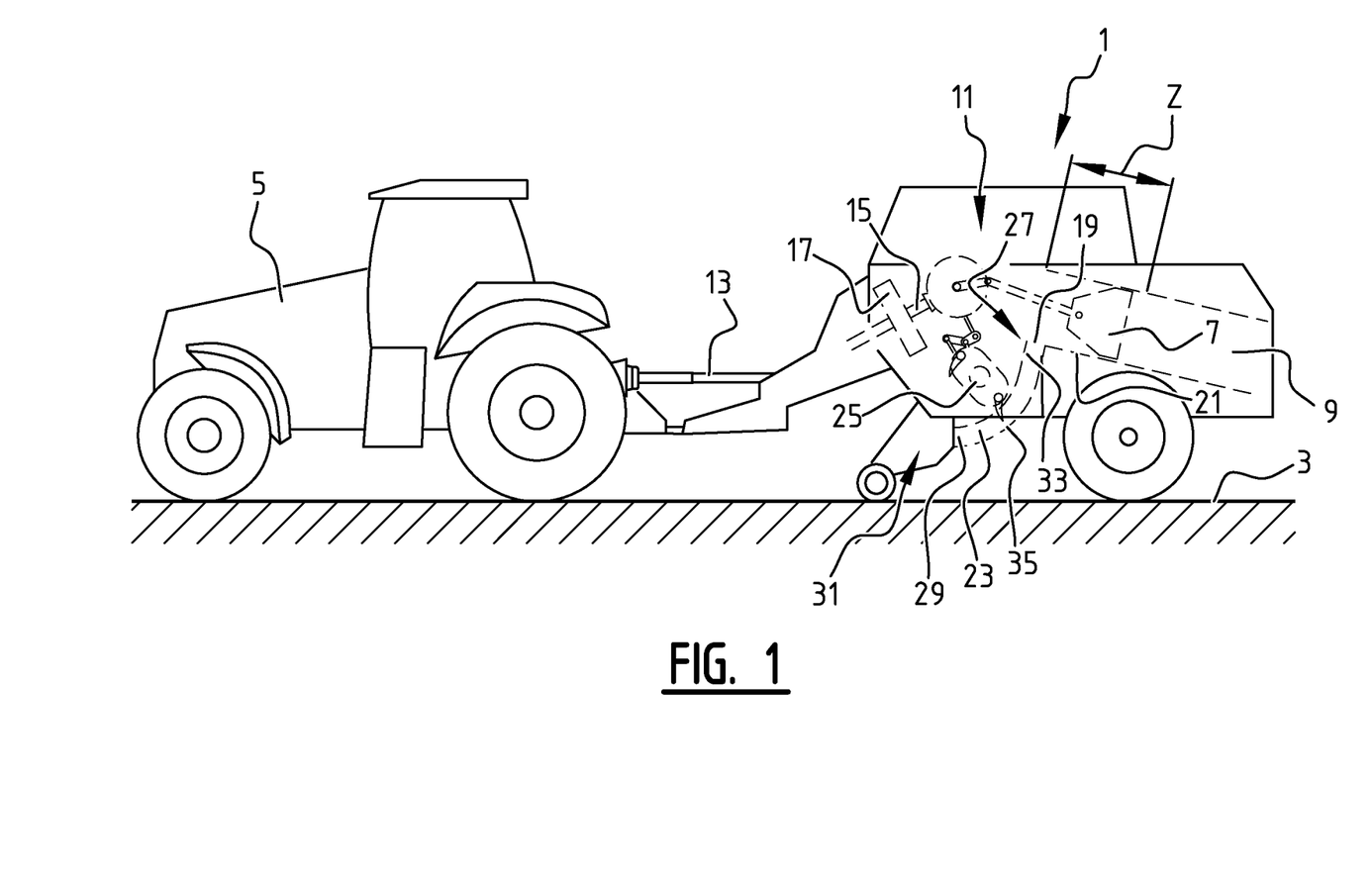
FIG. 1 shows a schematic side view of an embodiment of a baler according to the invention, pulled and driven by a tractor.

FIG. 1 shows a rectangular agricultural baler 1. Baler 1 can be moved forward over ground surface 3 by means of a tractor 5. Baler 1 is provided with a plunger 7 that during operation is moved reciprocally along a linear path "Z" in bale chamber 9 by means of a crank mechanism 11 connected to plunger 7. Crank mechanism 11 is connected for driving via a drive shaft 13 to the motor of tractor 5. Tractor 5 is provided for this purpose with a power take-off device, also referred to as PTO. Drive shaft 13 connects an output shaft of the PTO of tractor 5 to an input shaft 15 of crank mechanism 11. A flywheel 17 is arranged on the input shaft of the crank mechanism.

The bale chamber 9 has an inlet opening 19 formed in the bottom wall 21 thereof. A feeder duct 23 communicates with the bale chamber 9 through the inlet opening 19 for charges of crop material to be transferred from the feeder duct 23 into the bale chamber 9. Feeder means 25 are operable within the feeder duct 23 to accumulate a charge of crop material therein and then stuff that accumulated charge into the bale chamber 9. The feeder duct 23 has an upper end 27 facing generally upwardly and communicating with the inlet opening 19 in the bale chamber 9 and a lower end 29 facing generally in a forward direction and communicating with a pickup unit 31.

Figure 2:
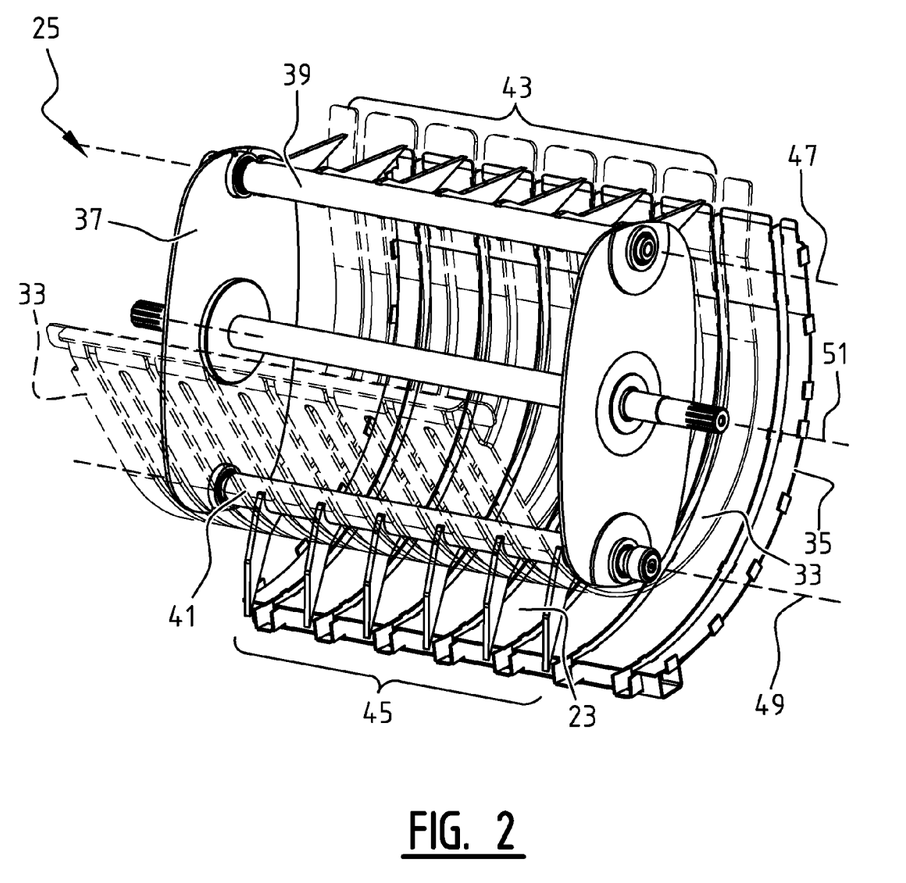
FIG. 2 shows a perspective view of the feeder means of the baler shown in FIG. 1.
Figure 3:
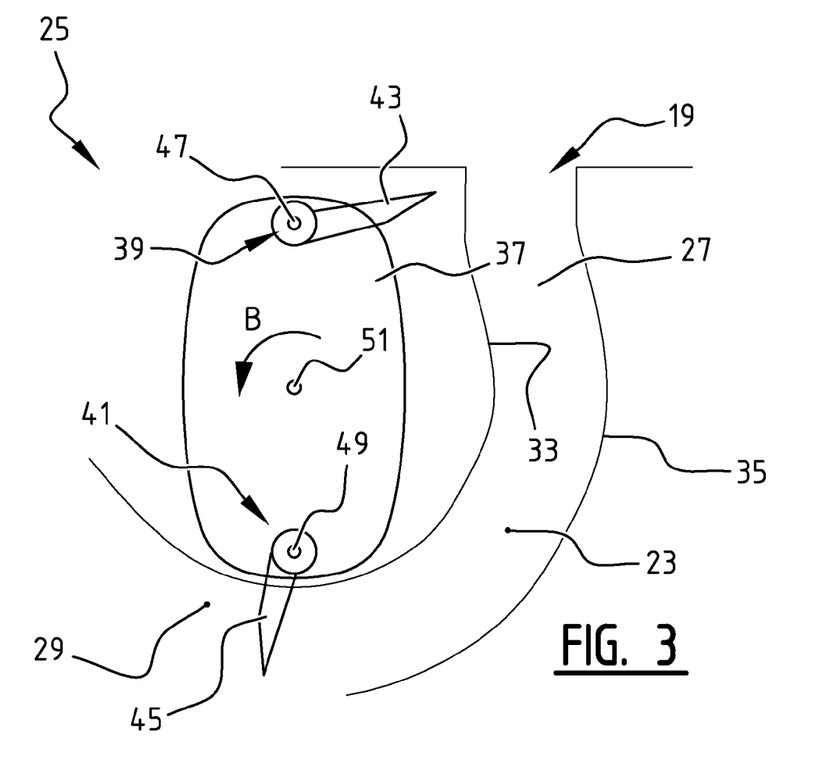
FIG. 3 shows a schematic side view of FIG. 2.

In FIGS. 2 and 3 a part of the feeder duct 23 is shown as well as the feeder means 25. The feeder duct 23 is formed between an upper wall 33 and a lower wall 35. In FIG. 2 only the rear part of the lower wall 35 of the feeder duct 23 is shown. The feeder means 25 are shown with a tine bar holding member formed by drum 37 having rotatable mounted thereon a first tine bar 39 and a second tine bar 41. Each tine bar 39, 41 is rotatable about its own axis 47, 49, respectively. The first tine bar 39 has mounted thereon a first set of tines 43. The second tine bar 41 has mounted thereon a second set of tines 45. The drum 37 is rotatable mounted on a part of a frame of the baler 1, such that the tine bars 39, 41 are rotatable about a common offset axis 51, being the axis of rotation of the drum 37.

Figure 4A:
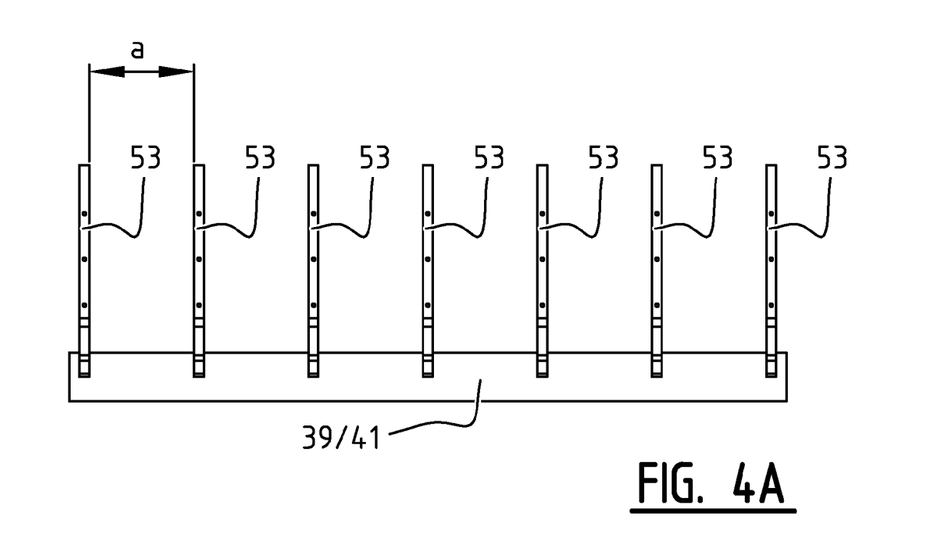
FIGS. 4A and 4B show a tine bar of the feeder means shown in FIGS. 2 and 3.
Figure 4B:
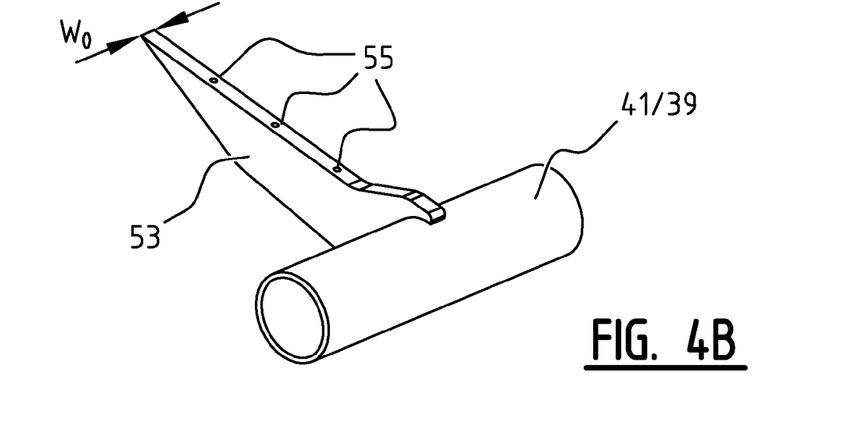
Figure 5:
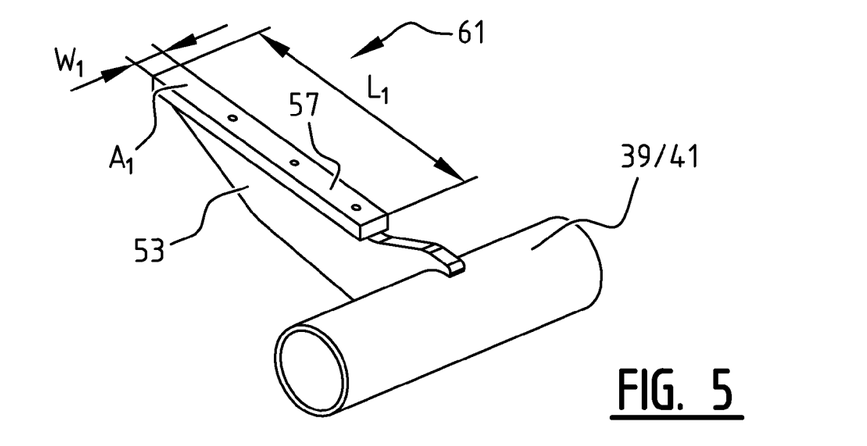
FIG. 5 shows the tine body of FIG. 4B having mounted thereon a first plate.
Figure 6:
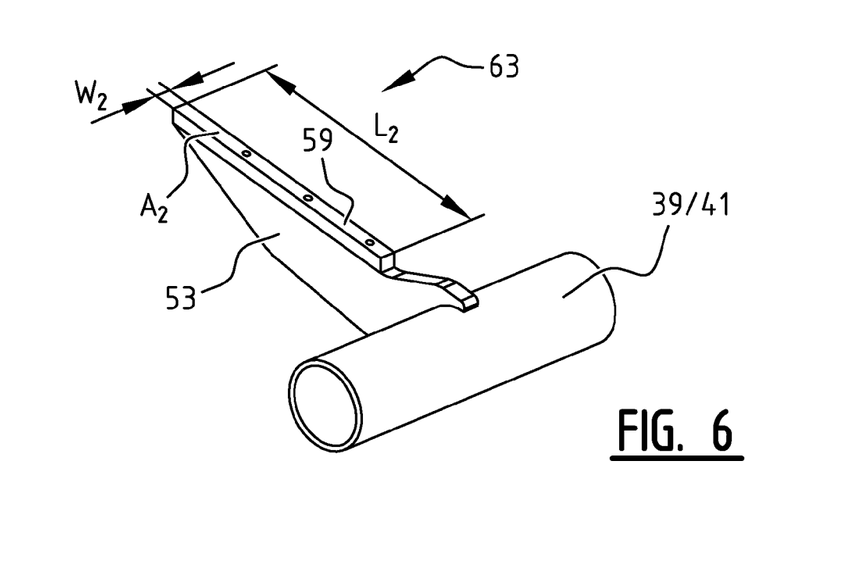
FIG. 6 shows the tine body of FIG. 4B having mounted thereon a second plate.

In FIGS. 4A and 4B is shown that the first and second tine bar 39, 41, are identical and each have mounted thereon tine bodies 53. The tine bodies 53 are distributed along the length of the tine bar 39, 41 with a distance "a" between adjacent tine bodies 53. Each tine body 53 is provided with a mounting arrangement in the form of threaded holes 55. As shown in FIGS. 5 and 6, the threaded holes 55 allow for mounting plates 57, 59 on the tine body 53 for providing either a first tine 61 or a second tine 63.

In FIG. 5 a first tine 61 is shown. Said first tine 61 is provided with a first plate 57 having a width "W1" that is larger than the width "W0" of the tine body 53.

In FIG. 6 a second tine 63 is shown. Said second tine 63 is provided with a second plate 59 having a width "W2" that corresponds to the width "W0" of the tine body 53 and that is thus smaller than the width "W1" of the first tine 61.

The lengths "L1" and "2L" of the first plate 57 and second plate 59 are the same. The area "A1" of the front face of the first plate 57 is larger than the area "A2" of the front face of the second plate 59.

With feeder means 25 as shown in FIGS. 2 to 6, by rotating the drum 37 in the direction of arrow B while causing the first tine bar and second tine bar to rotate about their respective own axis of rotation relative to the drum 37, it is possible to cause the first set of tines 43 and the second set of tines 45 to follow a path of movement through the feeder duct 23.

Figure 7:
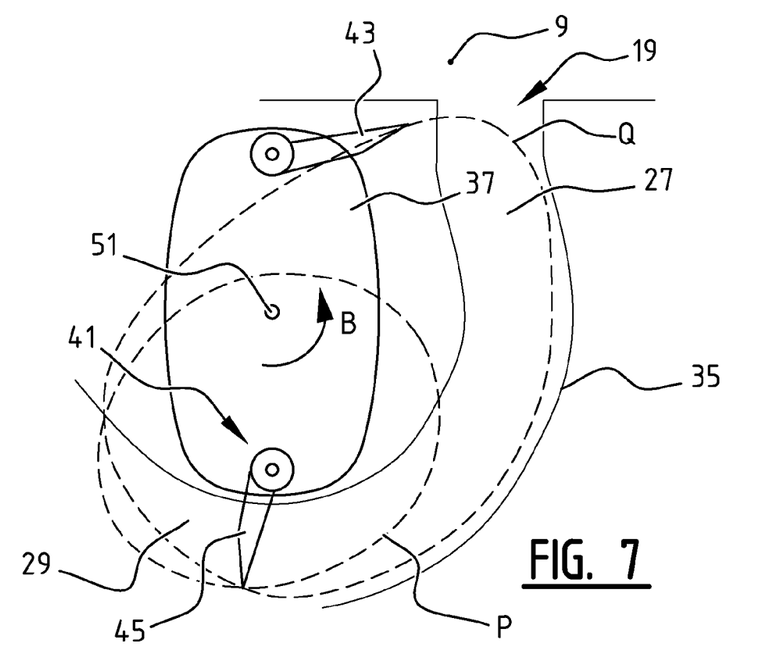
FIG. 7 shows the side view of FIG. 3 including an indication of paths of movement of the sets of tines of the feeder means.

As shown in FIG. 7, it is for instance possible to cause the second set of tines 45 to follow an accumulating movement path P each full rotation of the drum 37 about its axis 51 of rotation, while causing the first set of tines 43 to follow a stuffing movement path Q each full rotation of the drum 37 about its axis 51 of rotation. While following the accumulating movement path P the tines of the second set of tines 45 engage crop material at the lower end 29 of the feeder duct and move crop material in the direction of the upper end 27 of the feeder duct 23 in order to accumulate a charge of crop material in the feeder duct 23. While following the stuffing movement path Q the tines of the first set of tines 43 engage the accumulated charge of crop material starting at the lower end 29 and up to the upper end 27 of the feeder duct and stuff, i.e. transfer, said charge of crop material through the inlet opening 19 into the bale chamber 9. Each full rotation of the drum 37 about its axis 51 of rotation, first a charge of crop material is being accumulated by tines of the second set of tines 45 moving along accumulating movement path P through the feeder duct 23, and subsequently the accumulated charge of crop material is transferred into the bale chamber 9 by tines of the first set of tines 43 moving along stuffing movement path Q through the feeder duct 23.

Figure 8:
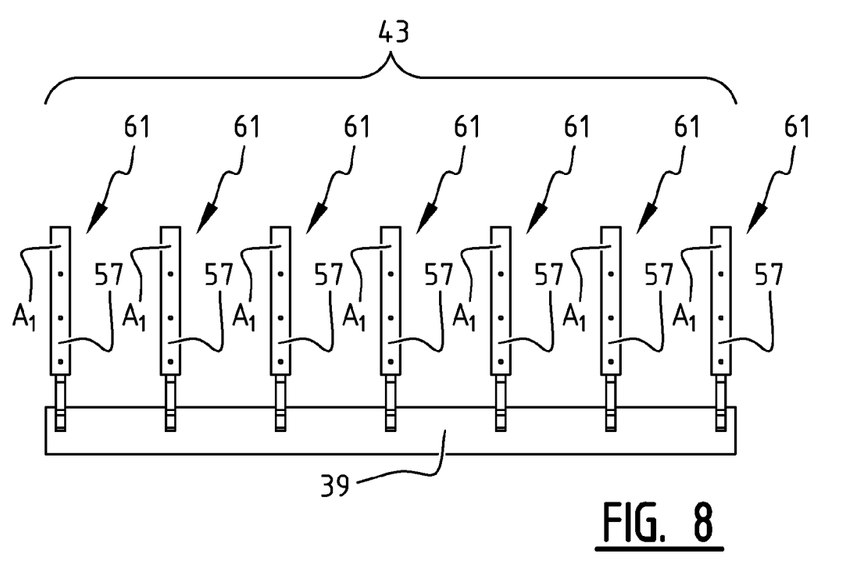
FIGS. 8 and 9 show a frontal view on a first set of tines and a second set of tines, respectively, of the feeder means of FIG. 7 in accordance with a first embodiment.
Figure 9:
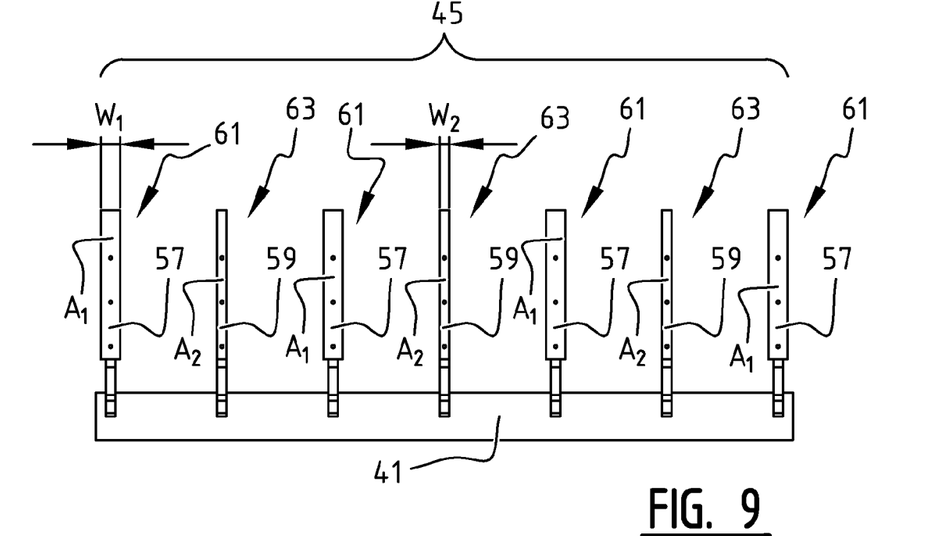

In FIGS. 8 and 9 an exemplary embodiment of tine arrangements according to the present invention is shown for the feeder means shown in FIG. 7.

In FIG. 8 is shown that the tines of the first set of tines 43 that is caused to move along the stuffing movement path Q are all first tines 61 as shown in FIG. 5, i.e. each being provided with a first plate 57. While moved through the feeder duct 23 along the stuffing movement path Q, the leading face of the first tines 61 defined by the plates 57 engages crop material and pushes the crop material forward thereby providing a pushing effect.

In FIG. 9 is shown that the second set of tines 45 that is caused to move along the accumulating movement path P includes both first tines 61 as shown in FIG. 5, each being provided with a first plate 57, and second tines 63, as shown in FIG. 6, each being provided with a second plate 59. In the second set of tines 45 single first tines 61 and single second tines 63 are alternatingly mounted on the second tine bar 41 along the length thereof. As shown, the first tines 61 have a leading face having a frontal area A1 defined by the first plate 57 that has a larger width W1 than the width W2 of the frontal area A2 of the leading face provided by the second plates 59 of the second tines 63. While moved through the feeder duct 23 along the accumulating movement path P, the leading face of the first tines 61 defined by the plates 57 engages crop material and pushes the crop material forward thereby providing a certain full pushing effect, while the leading face of the second tines 63, as a result of having a frontal area having a smaller width W2, provides a reduced pushing effect.

Thus in the exemplary embodiment with tine arrangements as shown in FIGS. 8 and 9, while accumulating a charge of crop material in the feeder duct by movement of the second set of tines 45 along the accumulating path of movement P, a part of the crop material is engaged with first tines 61 having a certain full pushing effect while a part of the crop material is engaged with second tines 63 having a reduced pushing effect. The alternating full and reduced pushing effect resulting from the alternating arrangement of single first tines 61 and single second tines 63 results in a more homogeneous charge of crop material. While subsequently stuffing the thus accumulated charge of crop material into the bale chamber 9 by movement of the first set of tines 63 along the stuffing path of movement Q, all the crop material is engaged with first tines 61 having the full pushing effect.

Figure 10:
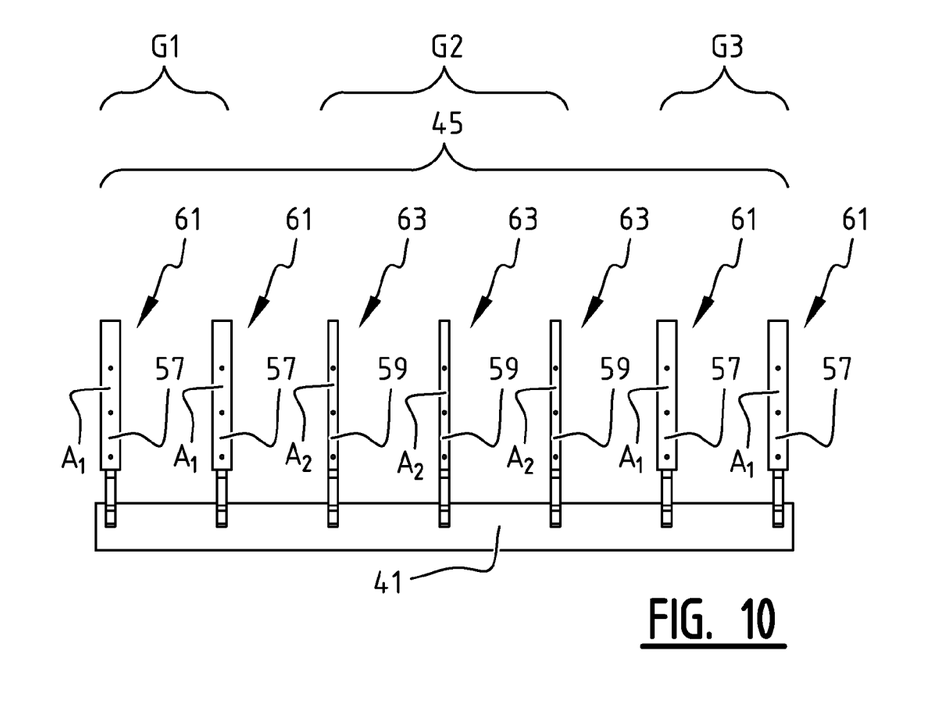
FIGS. 10 and 11 show a frontal view on two alternative embodiments of the second set of tines of FIG. 7.
Figure 11:
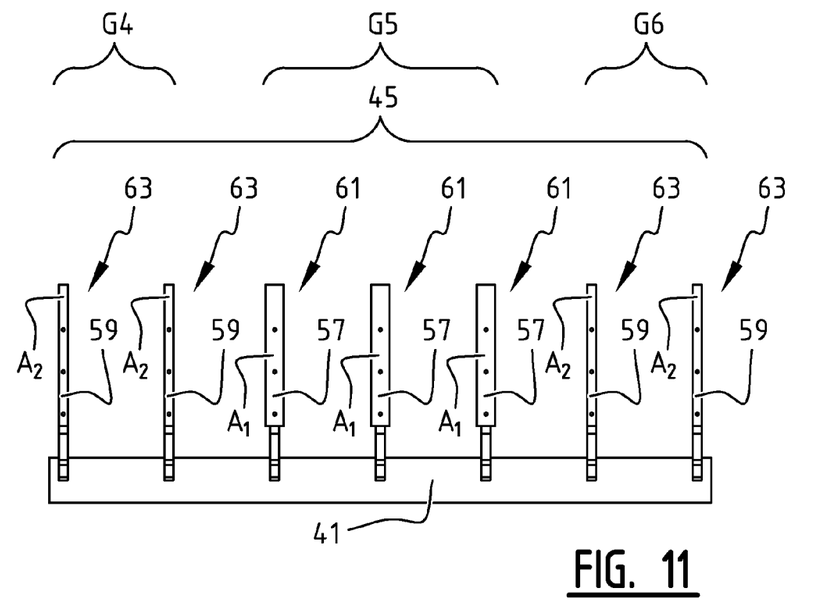

In FIGS. 10 and 11 alternative arrangements of tines are shown for the second set of tines 45 as shown in FIG. 9, i.e. the set of tines of which the tines are moved along the accumulating movement path P.

In FIG. 10 is shown that as a first alternative the second set of tines 45 includes three groups of tines G1, G2, G3 that are alternatingly mounted on the second tine bar 41 along the length thereof. Groups G1 and G3 each consist of first tines 61 having the frontal area A1 with the larger width W1. Group G2 consists of second tines 63 having the frontal area A2 with the smaller width W2.

In FIG. 11 is shown that as a second alternative the second set of tines 43 includes three groups of tines G4, G5, G6 that are alternatingly mounted on the second tine bar 41 along the length thereof. Group G4 and G6 each consist of second tines 63 having the frontal area A2 with the smaller width W2. Group G5 consists of first tines 61 having the frontal area A1 with the larger width W1.

Figure 12:
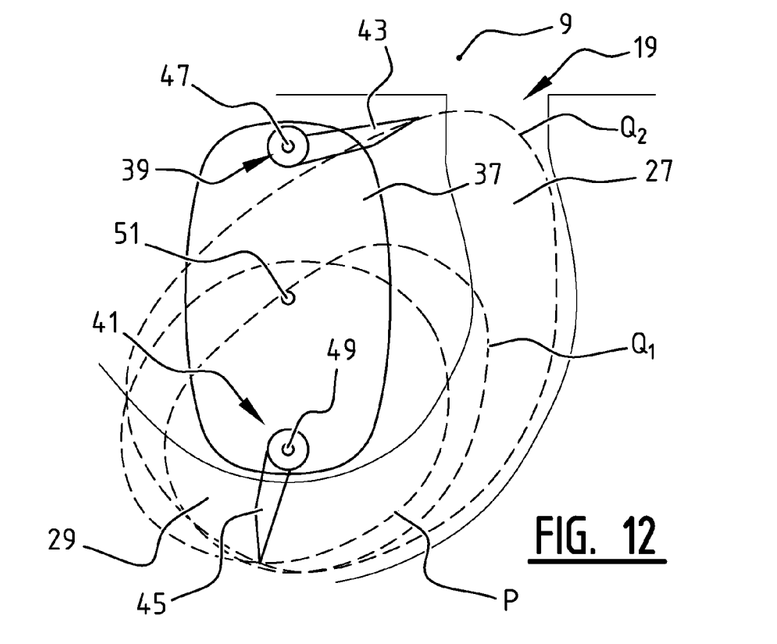
FIG. 12 shows the side view of FIG. 7 including an indication of alternative paths of movement of the sets of tines of the feeder means.

In FIG. 12 is shown that it is also possible with the feeder means 25 as shown in FIG. 2 to cause the second set of tines 45 to move along an accumulating movement path P each full rotation of the drum 37 about its axis 51 of rotation, while causing the first set of tines 43 to move alternatingly along an accumulating movement path Q1 and a stuffing movement path Q2. While following an accumulating movement path P the tines of the second set of tines 45 engage crop material at the lower end 29 of the feeder duct and move crop material in the direction of the upper end 27 of the feeder duct 23 in order to accumulate a charge of crop material in the feeder duct 23.

While following the accumulating movement path Q1 the tines of the first set of tines 43 engage crop material at the lower end 29 of the feeder duct and move crop material in the direction of the upper end 27 of the feeder duct 23 in order to accumulate a charge of crop material at the upper end of the feeder duct 23. While following the stuffing movement path Q2 the tines of the first set of tines 43 engage the accumulated charge of crop material starting at the lower end 29 and up to the upper end 27 of the feeder duct and stuff, i.e. transfer, said charge of crop material through the inlet opening 19 into the bale chamber 9. Each two rotations of the drum 37 about its axis 51 of rotation, tines are moved through the feeder duct 2 following said paths in accordance with the sequence P, Q1, P, Q2. Thus, first a charge of crop material is being accumulated during three accumulating movements of tines through the feeder duct 23, and subsequently the accumulated charge of crop material is transferred into the bale chamber 9 during a stuffing movement of tines through the feeder duct 23.

Figure 13:
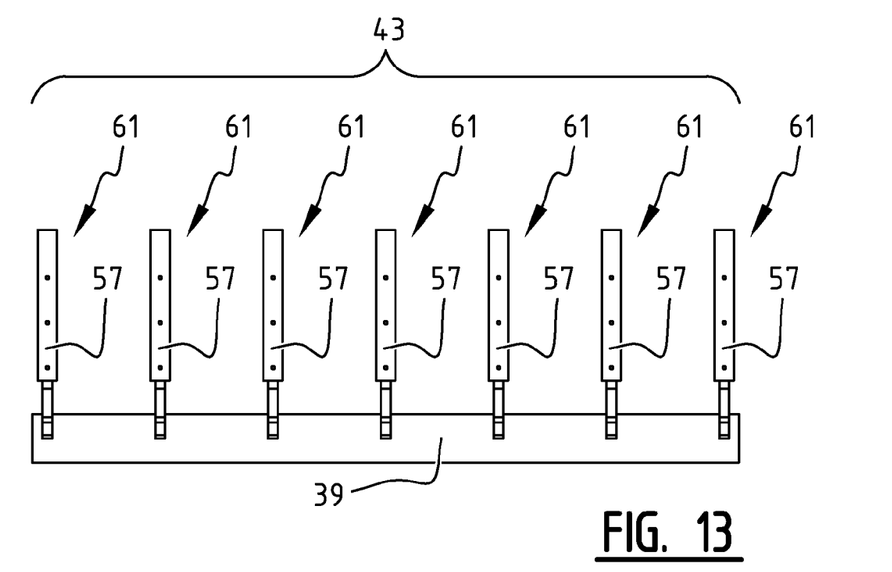
FIGS. 13 and 14 show a frontal view on a first set of tines and a second set of tines, respectively, of the feeder means of FIG. 12 in accordance with an advantageous embodiment.
Figure 14:
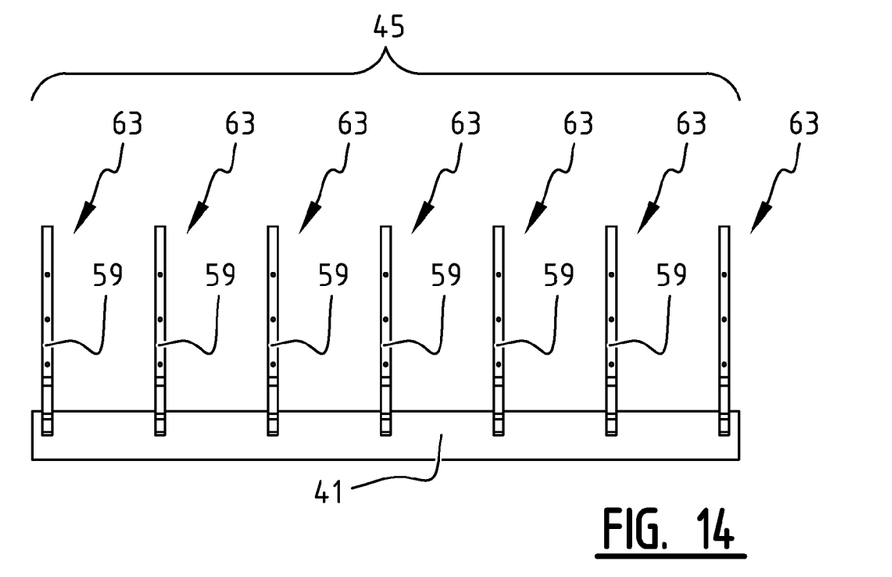

In FIGS. 13 and 14 an exemplary embodiment of tine arrangements in accordance with the invention is shown that is particularly effective in combination with the paths of movement shown in FIG. 12.

In FIGS. 13 and 14 is shown that the tines of the first set of tines 43 are all first tines 61 as shown in FIG. 5, i.e. tines that are each being provided with a first plate 57. The tines of the second set of tines 45 are all second tines 63 as shown in FIG. 6, i.e. tines that are each being provided with a second plate 59. In this exemplary embodiment during the three accumulating movements of tines through the feeder duct, all of the crop material is first engaged by the second tines 63 of the second set of tines 45 with reduced pushing effect, is subsequently engaged by the first tines 61 of the first set of tines 43 with full pushing effect, and is subsequently again engaged by the second tines 63 of the second set of tines 45 with reduced pushing effect. This alternating sequence of reduced and full pushing effect results in a more homogeneous charge of crop material. During the subsequent stuffing of the thus accumulated charge of crop material into the bale chamber 9 by movement of the first set of tines 63 along the stuffing path of movement Q2, all the crop material is engaged with first tines 61 having the full pushing effect.

Although the tine arrangement shown in FIGS. 13 and 14 is particularly effective in combination with the paths of movement shown in FIG. 12, the exemplary embodiments of tine arrangements in accordance with the invention described herein above under reference to FIGS. 8 to 11, are also effective in combination with the paths of movement shown in FIG. 12.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural baler, comprising:
   a bale chamber;
   a feeder duct communicating with the bale chamber for charges of crop material to be transferred from the feeder duct into the bale chamber;
   a plunger reciprocally moveable within the bale chamber to compress successive charges of crop material received from the feeder duct to form a bale; and
   a feeder operable within the feeder duct to accumulate a charge of crop material therein and then stuff that accumulated charge into the bale chamber, the feeder comprising (i) at least one first tine comprising a mounting surface, (ii) at least one second tine comprising a mounting surface, (iii) a first plate removably mounted to the mounting surface of the first tine, the first plate defining a first width, and (iv) a second plate removably mounted to the mounting surface of the second tine, the second plate defining a second width dimensioned smaller than the first width;
   wherein the first and second plates are interchangeable for selectively configuring a tine of the feeder to be the first tine or the second tine depending on a desired pushing effect.

2. The baler according to claim 1, wherein the feeder comprises at least two tine bars each having mounted thereon a set of tines, wherein the set of tines of at least one of said tine bars comprises at least one first tine and the set of tines of at least another one of said tine bars comprises at least one second tine; wherein:
   each of the at least two tine bars is rotatable about its own axis and about an offset axis;
   the tine bars are rotatably mounted on a tine bar holding member for rotation about their own axis;
   the tine bar holding member is rotatable about the offset axis; and
   the feeder is configured to cause the tine bars to rotate about their respective own axis when the tine bar holding member is rotated about the offset axis such that the tines of the tine bars are caused to move along a path of movement.

3. The baler according to claim 2, wherein the feeder is configured to cause the tines of the tine bar having mounted thereon a set of tines comprising at least one first tine to move at least along a stuffing movement path and at least one second tine, and wherein the feeder is further configured to cause the tines of the tine bar to move along an accumulating movement path.

4. The baler according to claim 3, wherein the set of tines of the tine bar that is caused to move at least along a stuffing movement path, comprises first tines.

5. The baler according to claim 3, wherein the feeder comprises a tine bar having mounted thereon a set of tines, wherein the set of tines comprises at least one first tine and at least one second tine.

6. The baler according to claim 5, wherein the set of tines that comprises at least one first tine and at least one second tine, comprises a plurality of first tines and a plurality of second tines; and the first tines and second tines are mounted alternatingly along a length of said tine bar.

7. The baler according to claim 5, wherein the set of tines that comprises at least one first tine and at least one second tine, comprises a plurality of first tines and a plurality of second tines; and groups of first tines and groups of second tines are mounted alternatingly along a length of the tine bar.

8. The baler according to claim 5, wherein the feeder is further operable to cause the tines of the tine bar having mounted thereon a set of tines comprising at least one first tine and at least one second tine to move through the feeder duct along an accumulating movement path.

9. The baler according to claim 1, wherein the at least first tine comprises a tine body with the mounting surface having mounted thereon the first plate defining a leading face of the first tine having a frontal area with the larger first width.

10. The baler according to claim 9, comprising a plurality of tine bodies provided with an arrangement for removably mounting the first or second plate thereon for providing the tine bodies with a leading face.

11. The baler according to claim 1, wherein the at least second tine comprises a tine body with the mounting surface having mounted thereon the second plate defining a leading face having a frontal area with the smaller second width, wherein the second width of the second plate of the second tine is at least a width of the tine body of the second tine.

12. A baler system, comprising:
    a baler comprising:
       a bale chamber;
       a feeder duct communicating with the bale chamber for charges of crop material to be transferred from the feeder duct into the bale chamber;
       a plunger reciprocally moveable within the bale chamber to compress successive charges of crop material received from the feeder duct to form a bale; and
       a feeder operable within the feeder duct to accumulate a charge of crop material therein and then stuff that accumulated charge into the bale chamber, the feeder comprising a plurality of tine bodies provided with an arrangement for mounting plates thereon for providing the tine bodies with a leading face; and
    a plurality of first plates and a plurality of second plates configured to be mounted on the tine bodies of the baler for providing the leading face of each of the tine bodies, wherein a width of a frontal area of the leading face of each of the tine bodies defined by the second plates is smaller than a width of a frontal area of the leading face of each of the tine bodies provided by the first plates; and
    wherein the plurality of first and second plates are interchangeable for selectively configuring a tine body of the feeder to be the tine body having the first plate or the tine body having the second plate depending on a desired pushing effect.

13. A method for configuring a baler, comprising:
    a bale chamber;
    a feeder duct communicating with the bale chamber for charges of crop material to be transferred from the feeder duct into the bale chamber;
    a plunger reciprocally moveable within the bale chamber to compress successive charges of crop material received from the feeder duct to form a bale; and
    a feeder operable within the feeder duct to accumulate a charge of crop material therein and then stuff that accumulated charge into the bale chamber, the feeder comprising at least one first tine body and at least one second tine body;
    the method comprising steps of:
       mounting on the first tine body a first plate providing a leading face; and mounting on the second tine body a second plate providing a leading face, wherein a width of a frontal area of the leading face provided by the second plate is smaller than a width of a frontal area of the leading face provided by the first plate; and wherein the first and second plates are interchangeable for selectively configuring a tine body of the feeder to be the tine body having the first plate or the tine body having the second plate depending on a desired pushing effect.

14. The baler according to claim 1, wherein the at least first tine comprises a first tine body and the at least second tine comprises a second tine body, the first and second tine bodies having an equal width.

* * * * *